P. BRUDERS.

FEEDING BOTTLE.

APPLICATION FILED MAR. 9, 1911.

Reissued Nov. 7, 1911. 13,308.

Witnesses:
Wm. H. Shaw
N. Boyajian

Inventor
Peter Bruders
By his Attorney
J. H. Metcalf

COLUMBIA PLANOGRAPH CO., WASHINGTON, D. C.

UNITED STATES PATENT OFFICE.

PETER BRUDERS, OF AACHEN, GERMANY.

FEEDING-BOTTLE.

13,308. Specification of Reissued Letters Patent. Reissued Nov. 7, 1911.

Original No. 953,256, dated March 29, 1910, Serial No. 528,573. Application for reissue filed March 9, 1911. Serial No. 613,474.

*To all whom it may concern:*

Be it known that I, PETER BRUDERS, a subject of the Emperor of Germany, and residing at Aachen, Germany, have invented certain new and useful Improvements in Feeding-Bottles, of which the following is a full, clear, and exact description, reference being had to the accompanying drawings, forming part of this specification.

My invention relates to feeding bottles, intended primarily for the use of infants, and the object thereof is to effectively prevent the escape of the contained liquid from the bottle, and yet automatically and without manual adjustment of the nipple, permit the entrance of sufficient air to prevent the maintenance of a partial vacuum within the bottle as the contents are withdrawn.

My invention consists in the novel arrangement, construction and combination of parts herein described and specifically pointed out in the claims.

Figure 1:
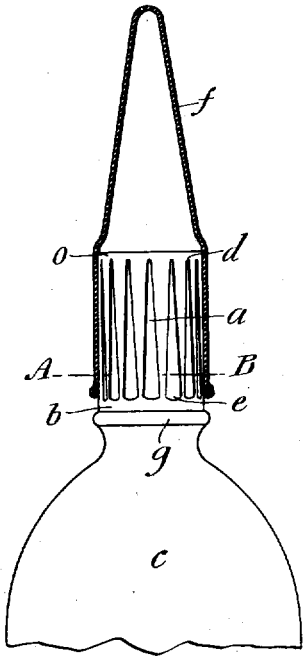
Figure 2:
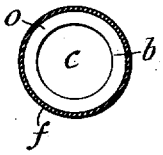
Figure 3:
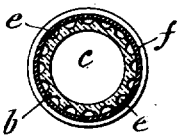
Figure 4:
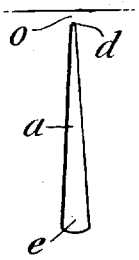
Figure 5:
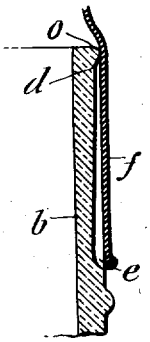
Figure 6:
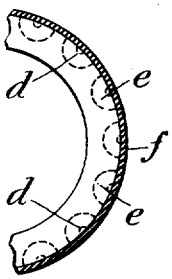

In the drawings, Figure 1 is a side elevation of the upper part of a feeding bottle embodying my invention; Fig. 2 is a plan view of the neck of the bottle; Fig. 3 is a section on the line A—B (Fig. 1); Fig. 4 is a detail view of one of the air conduits in a preferred form; Fig. 5 is a vertical section, on a larger scale, showing in detail the relative arrangement of the nipple and an air conduit; and Fig. 6 is a partial sectional view showing the top of the bottle and the nipple in section.

Similar reference characters are employed to designate like parts in all the views.

The neck *b* of the bottle *c* is fitted with an elastic nipple *f*, preferably of rubber, which is drawn well down over the neck of the bottle so that it will retain its position. The neck of the bottle is provided with a smooth narrow ring or annulus, which extends completely around the neck *b*, and forms a continuous unbroken contact surface *o* against which the inner wall of the nipple rests at all points in its circumference. This engagement of the surface *o* with the elastic nipple is sufficient to prevent the escape of liquid from the bottle.

In order to permit the entrance of air in limited but sufficient quantity to prevent the maintenance of a partial vacuum therein, as the contents are withdrawn I provide means for conducting air between the nipple and the neck directly to the lower margin of the contact surface *o*. In the preferred form which I have shown herein, the air-conducting means comprises a plurality of tapering grooves *e* in the bottle neck which extend under the nipple and terminate at the lower edge of the contact surface *o* affording a free passage of air under the nipple to the edge of the surface *o*.

As the contents of the bottle are withdrawn, a difference of pressure will be created at the upper and lower edges of the contact surface *o* which, owing to the limited width of the surface and the resiliency of the nipple at this point, will cause sufficient air to enter the bottle, between said surface and the elastic wall of the nipple in engagement therewith, to relieve such difference of pressure, preventing the maintenance of a vacuum within the bottle, the collapse of the nipple, and the interruption of the liquid supply therefrom which would otherwise occur.

It will be observed that the operation of my device is in a sense automatic and requires no adjustment of the nipple to insure its proper operation after the nipple has been placed in position on the neck of the bottle, and in fitting the nipple on the neck it is not essential that it should occupy any exact position so long as it is placed firmly enough on the neck to hold its place, and so long as air has free access to the lower end of the air conduits.

While I have herein shown and described a preferred form of my invention, it is not my intention to restrict my invention to details of construction except as specifically set forth in the claims.

I claim:

1. A feeding bottle provided with a smooth narrow annulus extending completely around the neck, forming an unbroken contact surface for the nipple, the bottle neck below said annulus being imperforate, an elastic nipple which fits closely against the contact surface at all points and extends below it over the neck of the bottle and air-conducting means extending under the nipple and terminating at the lower edge of the contact surface substantially as set forth.

2. A feeding bottle comprising a neck having a smooth narrow continuous peripheral contact surface, and being imperforate below said contact surface, an elastic nipple engaging said surface at all points and extending below it, and air conduits extending under the nipple and terminating at the lower edge of the contact surface, substantially as set forth.

3. A feeding bottle comprising a neck having longitudinally extending conical air conduits formed wholly upon its outer surface, a smooth margin between the apexes of said air conduits and the bottle's mouth to be engaged by a rubber nipple drawn over the air conduits, for the purpose of preventing the escape of liquid and yet allowing the entrance of air into the bottle, substantially as described and for the purposes set forth.

PETER BRUDERS.

Witnesses:
HENRY QUADFLEIG,
CATHIEN GILLES.

Copies of this patent may be obtained for five cents each, by addressing the "Commissioner of Patents, Washington, D. C."